(12) United States Patent
Niewels et al.

(10) Patent No.: US 7,234,930 B2
(45) Date of Patent: Jun. 26, 2007

(54) COOLING CIRCUIT FOR COOLING NECK RING OF PREFORMS

(75) Inventors: Joachim Johannes Niewels, Thornton (CA); Michael K. Zuraw, Georgetown (CA); Guoming Li, Brampton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 403 days.

(21) Appl. No.: 10/865,973

(22) Filed: Jun. 14, 2004

(65) Prior Publication Data

US 2005/0276879 A1 Dec. 15, 2005

(51) Int. Cl.
*B29C 45/73* (2006.01)

(52) U.S. Cl. .................. 425/547; 425/548; 425/552

(58) Field of Classification Search ............ 425/547, 425/548, 552, 556; 249/79, 80, 81
See application file for complete search history.

(56) References Cited

U.S. PATENT DOCUMENTS

| | | | |
|---|---|---|---|
| 4,622,001 A * | 11/1986 | Bright et al. | 425/552 |
| 5,204,055 A | 4/1993 | Sachs et al. | |
| 5,387,380 A | 2/1995 | Cima et al. | |
| 5,599,567 A | 2/1997 | Gellert | |
| 5,775,402 A | 7/1998 | Sachs et al. | |
| 5,930,882 A | 8/1999 | Gellert | |
| 6,017,209 A * | 1/2000 | Gellert et al. | 425/552 |
| 6,413,075 B1 | 7/2002 | Koch et al. | |
| RE38,396 E | 1/2004 | Gellert | |
| 6,701,997 B2 | 3/2004 | Gellert et al. | |

OTHER PUBLICATIONS

International Search Report for PCT/CA2005/000647, Aug. 15, 2005, pp. 1-3.

* cited by examiner

*Primary Examiner*—Tim Heitbrink

(57) ABSTRACT

A cooling circuit for a neck ring of a preform is conformed to the surface of the neck ring by providing a neck ring in two parts. The first part supports the neck ring and provides strength and durability to the neck ring insert. The second part is formed of porous steel impregnated with highly thermally conductive metal and includes a cooling channel that provides substantially uniform cooling around the neck ring of the preform.

28 Claims, 3 Drawing Sheets

COOLING CIRCUIT FOR COOLING NECK RING OF PREFORMS

BACKGROUND OF INVENTION

1. Field of the Invention

The present invention relates, generally, to the injection molding of preforms, and more particularly, but not exclusively, the invention relates to a mold insert for forming a neck ring on the preform and a method for making a mold insert.

2. Background Information

U.S. Pat. No. 5,599,567 to Gellert describes a neck ring insert for a perform mold that has a contoured cooling channel in the insert. The cooling circuit described in Gellert moves the coolant vertically in an outer channel and then horizontally to an inner channel that forms an inner cooling loop. The cooling loop has both horizontal and vertical sections and finally connects to an outer discharge channel. This channel construction causes more rapid cooling of the portions of the neck ring near the beginning of the cooling channel. The non-uniform cooling of the neck ring is undesirable.

U.S. Reissue Pat. No. 38,396 to Gellert describes a method of making a neck ring insert for a preform mold. A first portion of the neck ring is manufactured by investment casting and has a portion of a cooling circuit formed on an outer surface of the casting. An outer portion is brazed to the casting to form the neck ring and includes cooling channels that connect to the cooling channels on the first portion. The cooling channel so formed is a serial channel that provides the same non-uniform cooling that is provided in the Gellert U.S. Pat. No. 5,599,567 referenced hereinbefore.

There is a need for a simple, easy to manufacture and uniform cooling neck ring insert.

SUMMARY OF INVENTION

The present invention provides a two-part neck ring insert having a cooling circuit that provides substantially uniform cooling to the neck of a preform.

The present invention also provides a modular construction of the neck ring insert that enables it to combine features of strength and ease of manufacturing with the ability to readily change the cooling channels to provide the most desirable cooling for each different type of neck ring.

The present invention also provides a cooling module that is not preform specific but can be used with preforms having different neck ring shapes and sizes.

The present invention, also provides a neck ring insert that can be largely composed of highly thermally conductive materials without compromising the strength and wear characteristics of the neck ring insert.

The present invention also provides a neck ring insert that permits controlled cooling of the preform neck ring and, more particularly, more uniform cooling across the neck ring of the preform.

More particularly, the invention provides a cooling device for attachment to a neck ring half shell. The cooling device comprises a porous steel superstructure that is preferably impregnated with a highly thermally conductive metal and a divided coolant channel extending in opposite directions adjacent an inner circumference of the cooling device.

Further, the invention provides a cooling insert for cooling a selected portion of a molded device. The insert comprises a shell having an inner surface conforming to a first outer surface of the selected portion and a second outer surface, a cooling attachment having an inner surface conforming to the second outer surface; and a cooling circuit within the cooling attachment. The cooling circuit has an inlet portion for providing coolant to a divided channel near the conforming inner surface of the attachment. The divided channel forms two channels extending in opposite directions parallel with the conforming inner surface of the attachment.

Additionally, the invention provides an apparatus for cooling a preform that comprises an injection mold having a mold cavity therein; means for injecting molten plastic into the mold to form a preform; and means, in heat exchange relationship with the mold cavity, to cool the plastic from a molten condition to a solid condition. The heat exchange means includes neck ring half shells each having an inner surface conforming to a neck ring surface of the preform and an outer surface. A cooling attachment having an inner surface conforming to the outer surface is firmly securable to the outer surface of each neck ring half. A cooling circuit within the cooling attachment has an inlet portion for providing coolant to a divided channel near the conforming inner surface of the attachment. The divided channel forms two channels extending in opposite directions parallel with the conforming inner surface. Each divided channel feeds into a respective return channel. Each return channel extends toward a position near the inlet portion to return the coolant to an outlet portion situated near the inlet portion.

BRIEF DESCRIPTION OF DRAWINGS

Exemplary embodiments of the present invention will now be described with reference to the accompanying drawings, in which.

DETAILED DESCRIPTION

Preform molds typically comprise a stack of mold inserts. Each insert forms a part of a preform being molded. The insert stack is carried by two or more mold plates supported in a mold shoe. A hot runner manifold distributes injected plastic melt from a central infeeding sprue to hot runner nozzles connected to the molding cavities formed in each insert stack. A cold half of the mold includes the stack of mold inserts and the portion of the mold shoe on which they are mounted. The hot half of the mold includes the hot runner assembly including sprue bush and nozzles and the mold plates adjacent to the manifold.

Figure 1:
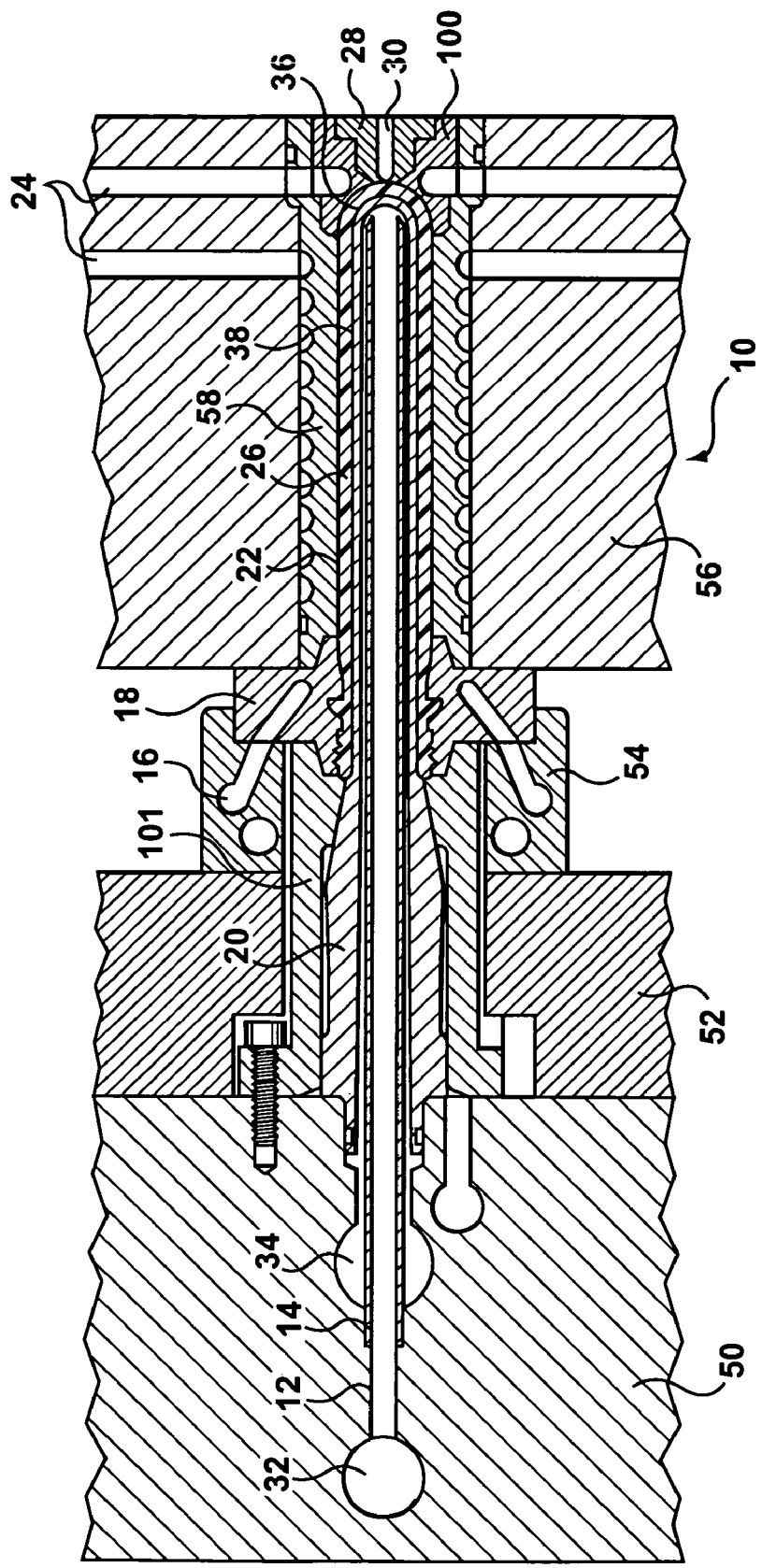
FIG. 1 is a cross sectional view of a prior art preform mold stack.

FIG. 1 shows a portion of a prior art preform mold stack 10 including core cooling channel 12, core cooling tube 14, neck ring cooling channels 16, neck rings 18, core 20, lock ring 101, mold cavity 22, cavity insert 58 and mold cooling channels 24 that extend circumferentially around the cavity. FIG. 1 also shows PET preform 26, mold gate insert 100 and injection nozzle 28. Core cooling channel 12 includes cooling inlet 32 and cooling outlet 34. The mold stack 10 is situated on a core plate 50, a stripper plate 52, a neck ring rail or slide 54, a cavity plate 56 and a cavity insert 58. A full description of the structure and operation of the preform molding apparatus can be found in U.S. Pat. No. 6,413,075 assigned to the present assignee.

The neck ring 18 is formed of two neck ring halves. Each half is formed as a single piece and is made from a hard durable material such as tool steel or stainless steel. The cooling channels are formed in the neck ring by drilling. This limits the coolant channels to substantially straight cylindrical holes that do not provide the ideal cooling path for cooling the neck of the preform. The neck ring must be made from this high strength material to withstand the high injection pressures and clamping forces.

Each neck ring half 18 can be improved by forming each half in two pieces. The first piece is made from tool steel or stainless steel as in FIG. 1. However, this first piece does not include any cooling channels. A second piece is formed by a three-dimensional printing process or other powder forming technique such as investment casting. The three dimensional printing process or other powder forming techniques permit the formation of ideal cooling channels within the structure. This provides a neck ring half with high strength provided by the first piece and high thermal conductivity provided by the second piece.

Figure 2:
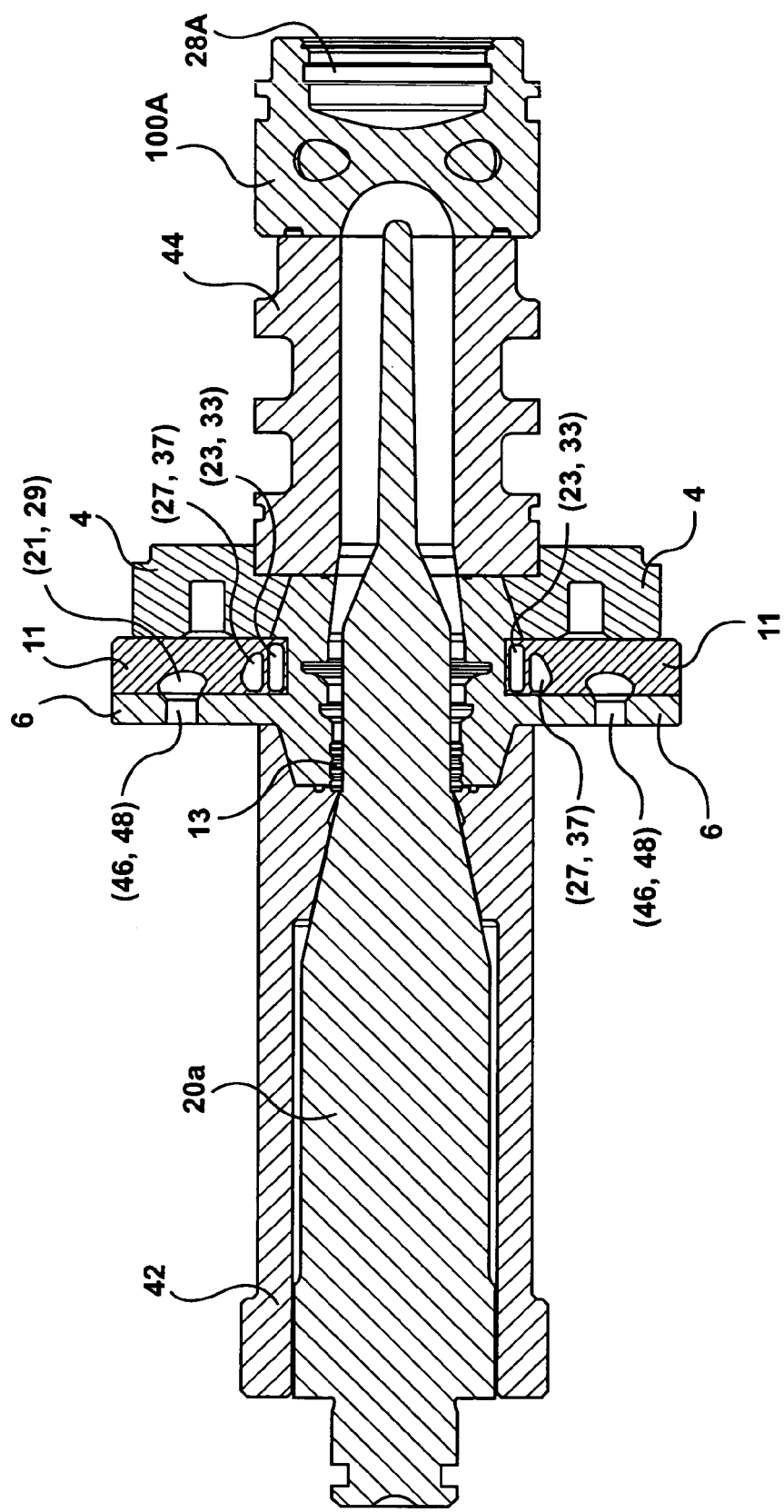
FIG. 2 is a cross sectional view of a portion of a preform mold stack modified to include the neck ring insert of the present invention.

In the preform mold stack shown in FIG. 2, the neck rings 18 have been replaced with new neck rings formed in accordance with the present invention. Each neck ring half consists of a neck ring half shell 6 and a cooling pack attachment 11. The neck ring half shell 6 is made of strong tool steel, as is the prior art half ring shell 18. The cooling pack attachment 11 is made by investment casting, three-dimensional printing or the like as will be further described hereinafter. The core insert 20A is shaped similarly to core insert 20 in FIG. 1 and shapes the preform in the mold in a well-known manner. Lock ring 42, in combination with cavity lock ring 4, clamps the half shells 6 and attachments 11 to mold cavity 44 as is well known in the art. Mold gate insert 100A provides support for an injection nozzle 28A.

Each neck ring half shell 6 has an inlet port 46 and an outlet port 48. The ports shown on FIG. 2 and designated (46, 48) could be either the inlet port or the outlet port. Each cooling pack attachment 11 includes an inlet channel 21 and an outlet channel 29. In the sectional view shown in FIG. 2, the channels designated (21, 29) could be either inlet channel 21 or outlet channel 29. Attachment 11 also includes return channels 27 and 37 and cooling paths 23 and 33. The channels 27 and 37 and paths 23 and 33 will be more fully described with reference to FIGS. 3 to 9.

Figure 3:
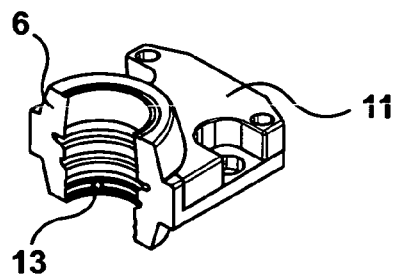
FIG. 3 is an isometric view of a neck ring half insert in accordance with the present invention.
Figure 4:
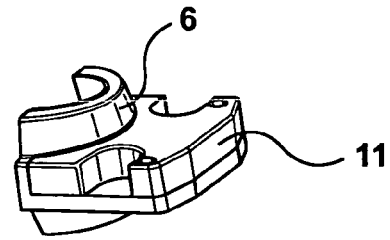
FIG. 4 is another isometric view of a neck ring half insert from a different angle than shown in FIG. 3.

As more particularly shown in FIG. 3, each neck ring insert of the invention comprises a neck ring half shell 6 and a cooling pack attachment 11. The shell 6 and attachment 11 are formed separately and joined together by brazing or welding or any other suitable means that provides close bonding of the two pieces.

The half shell 6 is formed of tool steel or stainless steel or other suitable high strength material in a manner well understood in the molding art. Because the tool steel is a relatively poor thermal conductor, the shell 6 is made with walls that are as thin as possible but retaining sufficient strength to withstand the stress of many injection cycles.

The attachment 11 is formed separately and is preferably formed using the three-dimensional printing method. This method is fully described in U.S. Pat. Nos. 5,204,055 and 5,387,380 to Sachs et al. Using that method, a first layer of metallic powder particles, such as stainless steel or H-13 steel, is deposited on a base. The particles are deposited uniformly at a density that will ultimately provide a preferable porosity that is up to 40 percent. After each layer is deposited a layer of binder material is formed on the metallic layer where it is desired to form solid portions of the structure of the attachment 11. Successive metallic powder particle layers and bonding layers are deposited until the full dimensions of the attachment 11 are reached. The piece is heated in an oven to cure the bound metal powder into a porous matrix while the binder material evaporates. This leaves a porous attachment with the desired cooling channels.

This porous structure may be impregnated with material to improve the thermal cooling characteristics of the structure. For example, to improve the cooling properties of the nick ring, the porous structure may be impregnated with material that has a high thermal conductivity. Ideally, the portion of the porous structure nearest the neck ring of the perform should be highly thermally conductive. The remainder of the porous structure need not be highly thermally conductive and, in fact, could be impregnated with thermally insulative material to limit the loss of cool away from the perform neck ring being cooled.

One way to impregnate the porous attachment is to place it adjacent a mass of a metal having a high thermal conductivity or in a bath containing such a metal and energized so as to cause the high thermal conductivity metal to impregnate the porous attachment and thereby improve its thermal conductivity. This results in an attachment 11 that retains the strength of tool steel, has a relatively high thermal conductivity and cooling channels that are ideally suited to controllably cool the molded device to be cooled.

Figure 5:
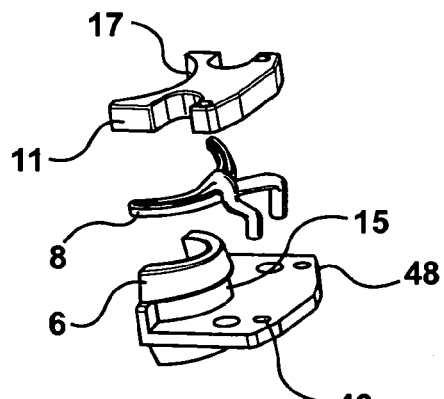
FIG. 5 is an isometric exploded view of the neck ring half insert shown in FIG. 3.

The neck ring shell 6 includes part molding surface detail geometry 13 that suits the molding of the part being produced. As shown in FIG. 5, the surface 15 is machined to mate intimately with a corresponding machined surface 17 on attachment 11. The cooling attachment 11 can be made in batch quantities and retained as a stock item to be attached to custom made neck ring shells 6 that may be designed for a variety of different neck ring designs. Thus a uniform cooling circuit that is highly efficient is provided for multiple types of neck rings.

FIG. 5 shows a view of the neck ring 6 and the attachment 11 with the cooling circuit 8 shown separately from the attachment 11. The actual cooling circuit 8 is formed in the attachment 11 by the above described three-dimensional printing process or investment casting process. It is shown separately here to better illustrate its unique shape and features.

Figure 6:
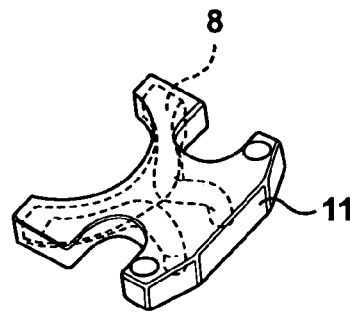
FIG. 6 is an isometric view of the cooling pack attachment showing, in outline, the cooling circuit of the present invention.

FIG. 6 illustrates, in outline, the preferable cooling circuit 8 that is formed in the attachment 11.

Figure 7:
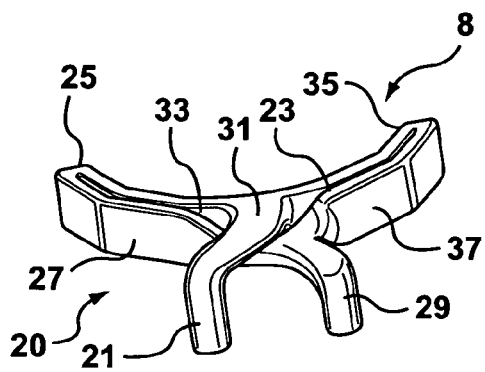
FIG. 7 is an isometric view of the cooling circuit of the present invention.

FIG. 7 shows the shape of the preferred cooling circuit 8 in detail. Inlet 21 receives coolant such as water and conveys it directly to the front of the cooling channel at 31. The coolant flow divides at 31 into two separate cooling paths 23 and 33 that are situated adjacent the periphery of the neck ring half shell 6 and closely follow the contour of the shell 6. At the extremities of the neck ring half shell, the cooling channel makes a 180 degree reversal at 25 and 35 and returns in return channels 27 and 37 to outlet channel 29 near the center of the neck ring shell 6.

The cooling circuit 8 has many advantages over previously designed cooling circuits for preform neck rings. First, the cooling circuit is symmetrical so that all areas of the neck are cooled at a substantially similar rate. Dividing the flow path in two reduces the length of each cooling path by half so that the coolant is discharged from the cooling circuit before it becomes too warm to effectively cool the neck ring. Even more significantly, the cooling circuit can be made any desired shape. In the present instance for cooling neck rings, the cooling circuit 8 is rectangular in cross-section with the long side of the rectangle parallel to the length direction of the preform and the narrow width of the channel perpendicular to the length of the preform. This ensures that more coolant flows closely to the surfaces that are to be cooled.

Figure 8:
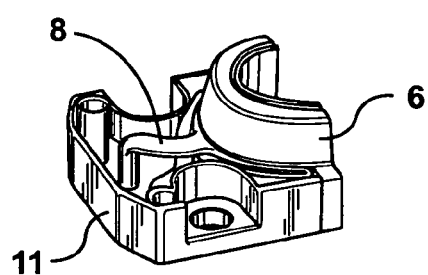
FIG. 8 is an isometric view of the neck ring half insert of the present invention.

FIG. 8 shows the mounting of cooling pack 11 on neck ring half shell 6.

Figure 9:
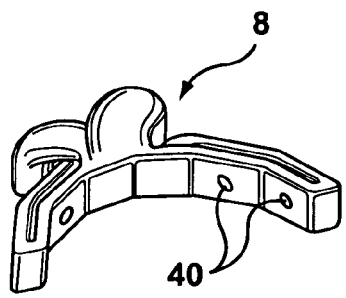
FIG. 9 is an isometric view of an alternative embodiment of the cooling circuit of the present invention.

FIG. 9 illustrates a further embodiment of the cooling circuit with baffles 40 in the coolant flow path. The baffles 40 cause turbulence in the flow path and improve the transfer of heat from the neck ring to the coolant in the cooling circuit. As is readily apparent, with the three-dimensional printing process or the investment casting process it is possible to locate baffles 40 of any desired shape in any position in the cooling circuit in the cooling pack attachment 11.

It will, of course, be understood that the above description has been given by way of example only and that modifications in detail may be made within the scope of the present invention.

What is claimed is:

1. A cooling device for attachment to a neck ring half shell, said cooling device comprising a structure with a divided cooling inlet channel extending from an inlet in opposite directions around an inner circumference of said cooling device.

2. A cooling device for attachment to a neck ring half shell, said cooling device comprising a porous steel superstructure impregnated with highly thermally conductive metal and a divided coolant channel extending from an inlet in opposite directions adjacent an inner circumference of said cooling device.

3. A cooling device as defined in claim 2 wherein said porous steel superstructure is formed using a three-dimensional printing process or an investment casting process.

4. A cooling insert for cooling a selected portion of a molded device, said insert comprising:
    a shell having an inner surface conforming to a first outer surface of said selected portion and a second outer surface;
    a cooling attachment having an inner surface conforming to said second outer surface; and
    a cooling circuit within said cooling attachment, said cooling circuit having an inlet portion for providing coolant to a divided channel near said conforming inner surface of said attachment, said divided channel forming two channels from said inlet extending in opposite directions parallel with said conforming inner surface of said attachment.

5. A neck ring cooling insert for cooling neck rings of a molded preform, said insert comprising:
    a neck ring half shell having an inner surface conforming to a neck ring surface of said preform and an outer surface;
    a cooling attachment having an inner surface conforming to said outer surface and being firmly securable to said outer surface; and
    a cooling circuit within said cooling attachment, said cooling circuit having an inlet portion for providing coolant to a divided channel near said conforming inner surface of said attachment, said divided channel dividing at said inlet to form two inlet channels extending in opposite directions parallel with said conforming inner surface, each divided channel feeding into a respective return channel, each said return channel extending toward a position near said inlet portion to return said coolant to an outlet portion situated near said inlet portion.

6. The insert of claim 5, wherein said channels in said cooling circuit are substantially rectangular in cross-section with a longer side adjacent said conforming inner surface of said attachment.

7. The insert of claim 5, wherein said inlet portion joins said divided channel at a substantially central point in said divided channel so that separate sections of said divided channel are of substantially equal length.

8. The insert of claim 6, wherein said inlet portion joins said divided channel at a substantially central point in said divided channel so that separate sections of said divided channel are of substantially equal length.

9. The insert of any one of claims 5, 6, 7 or 8, wherein each section of said divided channel reverses 180 degrees in direction as it nears an edge of said half shell and returns to said outlet portion on a path parallel to and behind an initial portion of said divided channel.

10. The insert of any one of claims 5, 6, 7 or 8, wherein baffles are situated in said cooling channels.

11. An neck ring insert for securing and cooling a preform comprising a pair of neck ring cooling inserts, each insert comprising:
    a neck ring half shell having an inner surface conforming to a neck ring surface of said preform and an outer surface;
    a cooling attachment having an inner surface conforming to said outer surface and being firmly securable to said outer surface; and
    a cooling circuit within said cooling attachment, said cooling circuit having an inlet portion for providing coolant to a divided channel near said conforming inner surface of said attachment, said divided channel dividing at said inlet to form two inlet channels extending in opposite directions parallel with said conforming inner surface, each divided channel feeding into a respective return channel, each said return channel extending toward a position near said inlet portion to return said coolant to an outlet portion situated near said inlet portion.

12. The insert of claim 11, wherein said channels in said cooling circuit are substantially rectangular in cross-section with a longer side adjacent said conforming inner surface of said attachment.

13. The insert of claim 11, wherein said inlet portion joins said divided channel at a substantially central point in said divided channel so that separate sections of said divided channel are of substantially equal length.

14. The insert of claim 12, wherein said inlet portion joins said divided channel at a substantially central point in said divided channel so that separate sections of said divided channel are of substantially equal length.

15. The insert of any one of claims 11, 12, 13 or 14, wherein each section of said divided channel reverses 180 degrees in direction as it nears an edge of said half shell and returns to said outlet portion on a path parallel to and behind an initial portion of said divided channel.

16. The insert of any one of claims 11, 12, 13 or 14, wherein baffles are situated in said cooling channels.

17. An apparatus for cooling a preform comprising:
an injection mold having a mold cavity therein;
means for injecting molten plastic into said mold to form a preform;
means in heat exchange relationship with said mold cavity to cool said plastic from a molten condition to a solid condition; said heat exchange means including a pair of neck ring half shells, each half shell having an inner surface conforming to a neck ring surface of said preform and an outer surface; a cooling attachment having an inner surface conforming to said outer surface and being firmly securable to said outer surface; and a cooling circuit within said cooling attachment, each said cooling circuit has an inlet portion for providing coolant to a divided channel near said conforming inner surface of said attachment, each said divided channel divides at said inlet to form two inlet channels extending in opposite directions parallel with said conforming inner surface, each divided channel feeding into a respective return channel, each said return channel extending toward a position near said inlet portion to return said coolant to an outlet portion situated near said inlet portion.

18. A cooling attachment for providing cooling to a preform, said attachment being securable to a neck ring half insert that supports and retains a threaded portion of said preform, said cooling attachment including:
an inner surface conforming to said outer surface and being firmly securable to said outer surface; and
a cooling circuit within said cooling attachment, said cooling circuit having an inlet portion for providing coolant to a divided channel near said conforming inner surface of said attachment, said divided channel dividing at said inlet to form two inlet channels extending in opposite directions parallel with said conforming inner surface, each divided channel feeding into a respective return channel, each said return channel extending toward a position near said inlet portion to return said coolant to an outlet portion situated near said inlet portion.

19. An apparatus for cooling a plurality of preforms comprising:
an injection mold having a plurality of mold cavities therein;
means for injecting molten plastic into each said mold cavity to form a preform;
means in heat exchange relationship with each said mold cavity to cool said plastic from a molten condition to a solid condition;
each said heat exchange means including a pair of neck ring half shells, each neck ring half shell has an inner surface conforming to a neck ring surface of a preform and an outer surface; a cooling attachment with an inner surface conforming to said outer surface and being firmly secured to said outer surface; and a cooling circuit within said cooling attachment, each said coaling circuit has an inlet portion for providing coolant to a divided channel near said conforming inner surface of said attachment, said divided channel divides at said inlet to form two inlet channels extending in opposite directions parallel with said conforming inner surface and feeds into a respective return channel, each said return channel extending toward a position near said inlet portion to return said coolant to an outlet portion situated near said inlet portion.

20. The cooling apparatus of claim 19, wherein said channels in said cooling circuits are substantially rectangular in cross-section with a longer side of said channels adjacent said conforming inner surface of said attachment.

21. The cooling apparatus of claim 19, wherein each said inlet portion joins a respective divided channel at a substantially central point in said divided channel so that separate sections of said divided channel are of substantially equal length.

22. The cooling apparatus of claim 20, wherein each said inlet portion joins a respective divided channel at a substantially central point in said divided channel so that separate sections of said divided channel are of substantially equal length.

23. The cooling apparatus of any one of claims 19, 20, 21 or 22, wherein each section of each said divided channel reverses 180 degrees in direction as it nears an edge of a respective half shell and returns to said outlet portion on a path parallel to and behind an initial portion of said divided channel.

24. The cooling apparatus of any one of claims 19, 20, 21 or 22, wherein baffles are situated in each of said cooling channels.

25. The insert of any one of claims 4, 5, 6, 7, 8, 11, 12, 13 or 14, wherein said cooling attachment is comprised of a porous steel superstructure impregnated with highly thermally conductive metal.

26. The insert of any one of claims 4, 5, 6, 7, 8, 11, 12, 13 or 14, wherein said cooling attachment is comprised of a porous steel superstructure impregnated with highly thermally conductive metal and is formed using a three-dimensional printing process or an investment casting process.

27. The apparatus of any one of claims 19, 20, 21 or 22, wherein said cooling attachment is comprised of a porous steel superstructure impregnated with highly thermally conductive metal.

28. The apparatus of any one of claims 19, 20, 21 or 22, wherein said cooling attachment is comprised of a porous steel superstructure impregnated with highly thermally conductive metal and is formed using a three-dimensional printing process or an investment casting process.

* * * * *